(12) United States Patent
Howell

(10) Patent No.: US 8,511,702 B1
(45) Date of Patent: Aug. 20, 2013

(54) ANTI-JACKKNIFE SYSTEM FOR BACKING-UP A TRAILER

(75) Inventor: Jeffrey E. Howell, Clanton, AL (US)

(73) Assignee: Richard D. Meyer, Birmingham, AL (US)

( * ) Notice: Subject to any disclaimer, the term of this patent is extended or adjusted under 35 U.S.C. 154(b) by 0 days.

(21) Appl. No.: 13/118,852

(22) Filed: May 31, 2011

Related U.S. Application Data

(60) Provisional application No. 61/350,333, filed on Jun. 1, 2010.

(51) Int. Cl.
*B60D 1/30* (2006.01)
*B62D 53/06* (2006.01)

(52) U.S. Cl.
USPC .......................... 280/432; 280/455.1; 280/474

(58) Field of Classification Search
USPC ........... 280/432, 445, 446.1, 447, 448, 455.1, 280/462, 463, 474
See application file for complete search history.

(56) References Cited

U.S. PATENT DOCUMENTS

| | | | |
|---|---|---|---|
| 2,475,174 A | 7/1949 | Boone | |
| 3,033,593 A | 5/1962 | Zaha | |
| 3,036,845 A | 5/1962 | Till | |
| 3,353,841 A | 11/1967 | Neal | |
| 4,003,586 A * | 1/1977 | Luck | 280/455.1 |
| 4,147,372 A | 4/1979 | Sumpter | |
| 4,305,602 A | 12/1981 | Ungvari et al. | |
| 4,512,593 A | 4/1985 | Ehrhardt | |
| 4,664,403 A | 5/1987 | Livingston | |
| 5,558,351 A | 9/1996 | Hunter | |
| 6,688,631 B1 * | 2/2004 | Andre | 280/455.1 |
| 6,712,380 B1 * | 3/2004 | Edens | 280/491.1 |
| 6,838,979 B2 | 1/2005 | Deng et al. | |
| 7,154,385 B2 | 12/2006 | Lee et al. | |
| 7,527,279 B1 * | 5/2009 | McCalip | 280/474 |
| 7,715,953 B2 | 5/2010 | Shepard | |
| 2008/0246253 A1 * | 10/2008 | Timmons | 280/442 |

* cited by examiner

*Primary Examiner* — Kevin Hurley
*Assistant Examiner* — Marc A Scharich
(74) *Attorney, Agent, or Firm* — Gerald M. Walsh; Kenneth M. Bush; Bush Intellectual Property Law

(57) ABSTRACT

The anti jackknife system has locking mechanisms which automatically lock caster type wheels at the rear of a trailer in a fixed position in the direction parallel to the longitudinal centerline of the trailer and to the line of direction of travel of the tow vehicle pulling the trailer forward. In this forward configuration the tongue of the trailer freely rotates on a trailer hitch insert. In a back up configuration a locking mechanism automatically locks the trailer tongue into linear alignment with the trailer hitch insert. The caster type wheels rotate freely about a vertical axis, and when the trailer is backed up by the tow vehicle the trailer will stay in linear alignment with the tow vehicle. The caster type wheels will automatically turn in a direction corresponding to the front wheels of the tow vehicle, thereby completely preventing jackknifing of the trailer.

7 Claims, 4 Drawing Sheets

ANTI-JACKKNIFE SYSTEM FOR BACKING-UP A TRAILER

CROSS-REFERENCE TO RELATED APPLICATION

The present application claims priority to U.S. Provisional Patent Application No. 61/350,333, filed Jun. 1, 2010, the disclosure of which is incorporated herein by reference.

FIELD OF THE INVENTION

The present invention relates to trailers with caster wheels and trailer hitch systems to prevent jackknifing when backing up a trailer, and more particularly to an anti jackknife system which automatically prevents jackknifing when the tow vehicle is put into reverse gear.

BACKGROUND OF THE INVENTION

It is well known that backing up a vehicle with a trailer is difficult and frustrating. Much of the difficulty associated with backing up a trailer results from the fact that it is not intuitive for drivers to sense the jackknifing situation before it is too late and from the fact that many drivers do not know how to steer properly in order to align the trailer to avoid a jackknifing situation. In general, vehicle-trailer backing up is by nature an unstable motion. Jackknifing occurs when a vehicle-trailer is approaching away from its equilibrium position, a position intended by the driver through his or her steering input, and thus becomes unstable. The relative angle between vehicle and trailer diverges from the driver's intended target angle, and usually increases if proper steering and/or braking action are not taken. This is typically out of control by the driver, either due to lack of sufficient driving skill, or the condition is too severe.

U.S. Pat. No. 5,558,351 describes an anti jackknife assembly for a vehicle-trailer, but it is operable only when the trailer is being towed in the forward direction. The trailer hitch has an arcuate extension which extends away from the ball joint. The tongue of the trailer hitch has a ball socket which engages the ball joint, and also has a solenoid device which engages the tip of the arcuate extension when energized and limits the degree to which the ball socket can pivot on the ball joint.

The use of caster type wheels on trailers are known to be useful to prevent jackknifing during backing-up the trailer. U.S. Pat. No. 2,475,174 discloses a trailer having a pair of caster-type wheels, with the trailer having a single central hitch for attachment to the towing vehicle. The trailer also has a pair of separate auxiliary connectors disposed on opposite sides of the hitch adjacent the ends of the vehicle bumper. The auxiliary connectors control a flexible cable linkage, which in turn controls the swiveling of the casters. A three-point hitch arrangement is disclosed, and does not permit free swiveling of the casters, but rather provides a complex arrangement for controlling swiveling of the casters. U.S. Pat. No. 3,033,593 discloses a trailer having a pair of caster-type wheels, a central hitch of conventional configuration, and a pair of sidewardly spaced tie bars so as to create a three-point connection. This arrangement rigidifies the trailer relative to the vehicle, but the side tie bars must be released when swiveling of the wheels and backing of the trailer is desired. Further, this three-point connection does not permit proper rolling movement of the trailer relative to the vehicle, such as may be necessary to compensate for irregularities in the highway. U.S. Pat. No. 4,305,602 discloses a trailer having caster-type wheels, with the trailer having a dual hitch arrangement so as to rigidify the trailer relative to the vehicle. This double hitch arrangement, however, has several disadvantages. The tow vehicle must be provided with a specialized tow bar which mounts hitch balls thereon. Further, the overall hitch arrangement does not permit or compensate for rolling movement of the trailer relative to the vehicle due to unevenness in the highway. This hitch arrangement also does not permit even weight distribution on the trailer or vehicle wheels. U.S. Pat. No. 4,512,593 discloses two caster wheels joined together by drive sprockets and chains so that the caster wheels are constrained for simultaneous movement. The trailer also has two rigid tow bars which couple to sidewardly-spaced hitch balls mounted on the tow vehicle. This arrangement does not permit relative roll between the vehicle and trailer.

What is needed is a simple, convenient means of preventing jackknifing automatically during backing up, but which allows the trailer to pivot freely on a single ball joint when moving in the forward direction.

SUMMARY OF THE INVENTION

The anti jackknife system for a trailer disclosed herein has a trailer hitch insert attachable to a tow vehicle, and a tongue on a front end of the trailer. The tongue has a locking slide plate and is reversibly and rotatably attached to the trailer hitch insert. Caster type wheels rotatable about a vertical axis are attached to an opposite rear end of the trailer. The caster type wheels have a locking wheel plate attached thereto. A slide plate locking mechanism is attached to the tongue. The slide plate locking mechanism inserts the locking slide plate into the trailer hitch insert when the slide plate locking mechanism is energized. The slide plate locking mechanism withdraws the locking slide plate from the trailer hitch insert when the slide plate locking mechanism is not energized. A wheel locking mechanism is attached to the trailer. The wheel locking mechanism has a locking pin which is inserted into a hole in the locking wheel plate when the wheel locking mechanism is not energized. The locking pin is removed from the hole in the locking wheel plate when the locking wheel mechanism is energized. The tongue does not rotate on the trailer hitch insert only when the slide plate locking mechanism is energized. The caster type wheels are rotatable about a vertical axis (swivels) only when the wheel locking mechanism is energized. The anti jackknife system automatically reversibly locks the trailer tongue of the trailer in alignment with the trailer hitch insert of the tow vehicle, and automatically reversibly unlocks the caster type wheels on the trailer for backing up the tow vehicle and trailer. To proceed forward with the vehicle and trailer, the trailer tongue is automatically reversibly unlocked from the trailer hitch insert so the trailer tongue pivots freely on the trailer hitch insert. At the same time, the caster type wheels are automatically reversibly locked into a direction parallel with the centerline of the trailer. The locking mechanisms may be energized by connecting them to the electrical circuitry of the reverse (back up) lights so that the locking mechanisms are energized automatically only when the tow vehicle is in reverse gear.

An advantage of the present invention is that jackknifing is completely prevented during the backing up of the trailer by the tow vehicle when the side plate locking mechanism and the wheel locking mechanisms are energized simultaneously, preferably by placing the transmission of the tow vehicle in reverse.

Another advantage is that the system automatically reversibly locks the trailer tongue of the trailer in alignment with the trailer hitch insert of the tow vehicle and automatically reversibly unlocks caster type wheels on the trailer for backing up the tow vehicle and trailer.

Another advantage is that the system automatically reversibly unlocks the trailer tongue from the trailer hitch insert so the trailer tongue pivots freely on the trailer hitch insert and, at the same time, the caster type wheels are reversibly locked into a direction parallel with the centerline of the trailer for the forward movement of the tow vehicle and trailer.

Another advantage is that the locking mechanisms can be solenoids which are energized by connecting them to the electrical circuitry of the reverse lights so that the solenoids are energized only when the tow vehicle is in reverse gear.

Another advantage is that when the trailer is backed up by the tow vehicle the trailer will stay in linear alignment with the tow vehicle, and the caster type wheels will automatically turn in a direction corresponding to the front wheels of the tow vehicle.

DETAILED DESCRIPTION OF THE INVENTION

While the following description details the preferred embodiments of the present invention, it is to be understood that the invention is not limited in its application to the details of construction and arrangement of the parts illustrated in the accompanying drawings, since the invention is capable of other embodiments and of being practiced in various ways.

The present invention comprises a trailer hitch insert having a female end for receiving a locking side plate, and a trailer tongue connectable to a trailer, with the trailer tongue having a locking slide plate housing to contain the locking slide plate. The trailer has caster type wheels at the rear end of the trailer, with the caster type wheels each having a locking wheel plate. There is a slide plate locking mechanism to push the locking slide plate into the female end of the trailer hitch insert. The slide plate is biased to be withdrawn from the female end of the trailer hitch insert and into the locking plate housing. There are wheel locking mechanisms to push pins into the locking wheel plates and to withdraw the pins from the locking wheel plates. When the locking mechanisms are unenergized, the locking slide plate is biased for withdrawal out of the trailer hitch insert and into the locking plate housing, and the pins are biased for insertion into the locking wheel plates. In this configuration the female end of the trailer hitch insert is unlocked and the caster type wheels are locked. The castor type wheels will not rotate (swivel) about a vertical axis and will turn only in the direction parallel to the longitudinal centerline of the trailer and to the line of direction of travel. The tow vehicle is then ready to pull the trailer forward. When the locking mechanisms are energized, the locking slide plate is inserted in the female end of the trailer hitch insert and the pins are withdrawn from the locking wheel plates. In this configuration the female end of the trailer hitch insert is locked to the trailer tongue and the caster type wheels are unlocked. The tow vehicle is then ready to back up the trailer. When the trailer is backed up by the tow vehicle the trailer will stay in linear alignment with the tow vehicle, and the caster type wheels will automatically turn in a direction corresponding to the front wheels of the tow vehicle. Jackknifing is thereby completely prevented during the backing up of the trailer.

Figure 1:
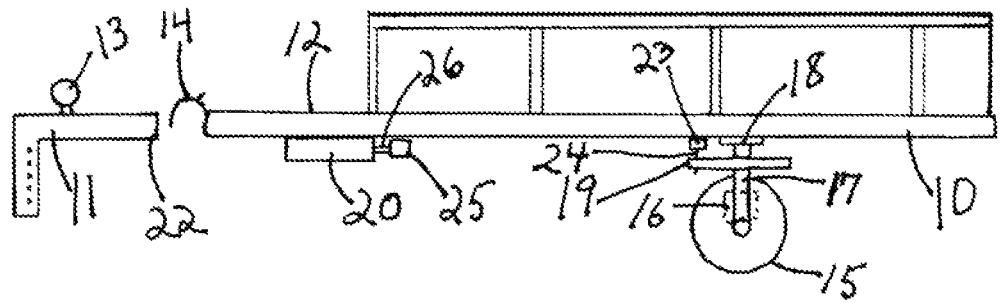
FIG. 1 shows a side view of the anti-jackknife system of the present invention configured for forward movement.

FIG. 1 shows a side view of the system of the present invention. Trailer 10 is reversibly attachable to the tow vehicle by means of a trailer hitch insert 11 which operates in a standard way well known in the art. Trailer 10 has a tongue 12 and trailer hitch insert 11 has a ball joint 13. The free end of tongue 12 has a ball socket 14 which fits over ball joint 13 so that ball socket 14 is reversibly locked to ball joint 13 but pivots freely on ball joint 13. Tongue 12 will, thus, rotate freely on hitch insert 11 by means well known in the art.

Trailer 10 has a pair of caster type wheels 15. Wheels 15 are attached to torsion axles 16 supported by vertical supports 17 which rotate (swivel) freely in support bases 18 attached to trailer 10, allowing the caster type wheels 15 to rotate (swivel) around a vertical axis. Vertical supports 17 each have a locking wheel plate 19 fixed thereto. Trailer tongue 12 has a housing 20, attached on the underside of trailer tongue 12, having a locking slide plate 21 contained therein (see FIGS. 6 and 7). Trailer hitch insert 11 has a portion extending away from the ball joint 13, terminating in a female end 22 for reversibly receiving slide plate 21 (see FIGS. 2, 4 and 7).

Trailer 10 has a wheel locking mechanism 23 attached thereon which automatically locks and unlocks wheel plate 19. Preferably, wheel locking mechanism 23 is a solenoid having a locking pin 24 which is inserted into a hole 28 (see FIGS. 5 and 8a) in locking wheel plate 19 by means of a spring (not shown) in wheel locking mechanism 23 when unenergized. The caster type wheels 15 are, preferably, locked in a position parallel to the centerline of trailer 10 when wheel locking mechanism 23 is unenergized.

Trailer tongue 12 has a slide plate locking mechanism 25 attached thereon which automatically prevents the trailer tongue 12 from rotating on the trailer hitch insert 11. Preferably, slide plate locking mechanism 25 is a solenoid having a connecting pin 26 fixed to the slide plate 21 (see FIG. 6) which inserts the slide plate 21 into concave opening 27 (see FIGS. 4 and 7) at the female end 22 of trailer hitch insert 11 when slide plate locking mechanism 25 is energized. When the slide plate 21 is inserted into the concave opening 27 of hitch insert 11, the trailer tongue 12 and hitch insert 11 act as one piece. In this configuration trailer 10 always remains in line with the tow vehicle, and the ball socket 14 cannot rotate on the ball joint 13.

FIG. 1 illustrates the system of the present invention configured for forward movement. Pin 24 is inserted into locking wheel plate 19 by means of a spring (solenoid 23 unenergized) and slide plate 21 is withdrawn into slide plate housing 20 (solenoid 25 unenergized) by means of a spring (not shown) in locking mechanism 25. When the trailer tongue 12 is connected to the trailer hitch insert 11 by attaching the ball socket 14 on the ball joint 13, the trailer tongue ball socket 14 will pivot freely on the ball joint 13. When the pin 24 is inserted into locking wheel plate 19 the caster type wheels 15 will not rotate on vertical supports 17 and will turn only in the direction parallel to the longitudinal centerline of the trailer 10 and to the line of direction of travel.

Figure 2:
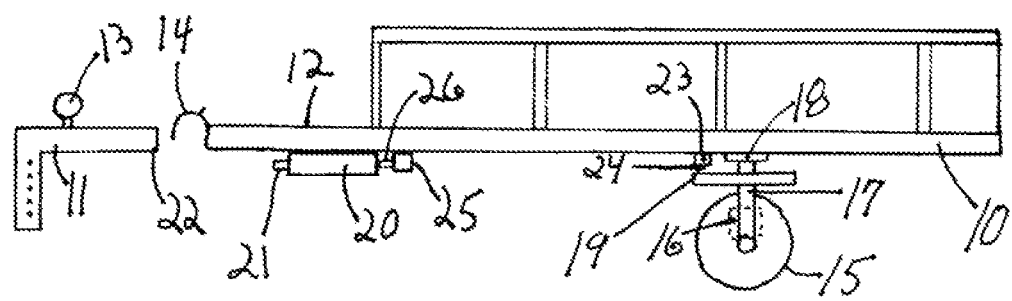
FIG. 2 shows a side view of the anti-jackknife system configured for backing up the trailer.

FIG. 2 illustrates the system of the present invention configured for backing up the trailer 10. Pin 24 is withdrawn out of the locking wheel plate 19 when solenoid 23 is energized, and locking slide plate 21 is extended out of slide plate housing 20 when solenoid 25 is energized. Slide plate 21 will move into concave opening 27 (see FIGS. 4 and 7) at the female end 22 of trailer hitch insert 11 when female end 22 is in alignment with the slide plate housing 20. When slide plate 21 moves into concave opening 27 the ball joint socket 14 cannot pivot on ball joint 13 and trailer tongue 12 is reversibly fixed into linear alignment with trailer hitch insert 11. When pin 24 is withdrawn from locking wheel plate 19 the caster type wheels 15 will rotate freely on vertical supports 17. When the trailer 10 is backed up by the tow vehicle the trailer 10 will stay in linear alignment with the tow vehicle. The caster type wheels 15 will automatically turn in a direction corresponding to the direction of the front wheels of the tow vehicle. Jackknifing is thereby completely prevented during the backing up of the trailer 10. Solenoids 23 and 25 can be connected to the electrical circuitry of the reverse lights of the tow vehicle so that when the tow vehicle is shifted into reverse the solenoids 23 and 25 are automatically energized and the solenoids 23 and 25 are automatically unenergized when the tow vehicle is shifted out of reverse.

Figure 3:
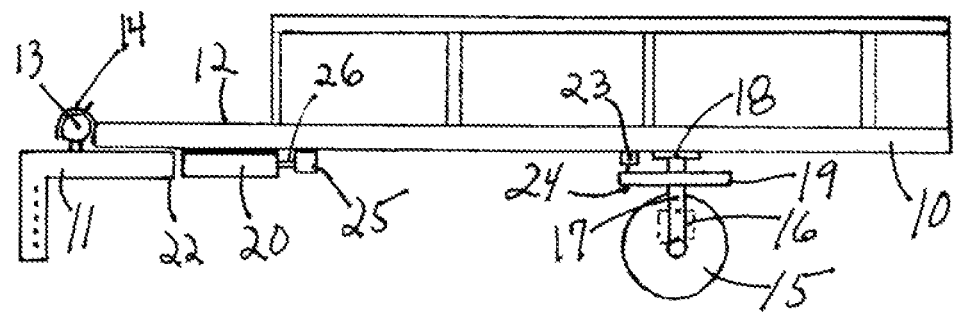
FIG. 3 shows the trailer tongue in position over the trailer hitch insert, and the ball hitch socket is in a locked position on the ball joint.

FIG. 3 shows the trailer tongue 12 in position over trailer hitch insert 11, and the ball hitch socket 14 is in locked position on ball joint 13. The trailer 10 and tow vehicle are configured for forward motion because the locking slide plate 21 is withdrawn into slide plate housing 20 by means of the spring in the solenoid 25, and solenoid pin 24 is inserted into locking wheel plate 19 by means of the spring in the solenoid 23.

Figure 4:
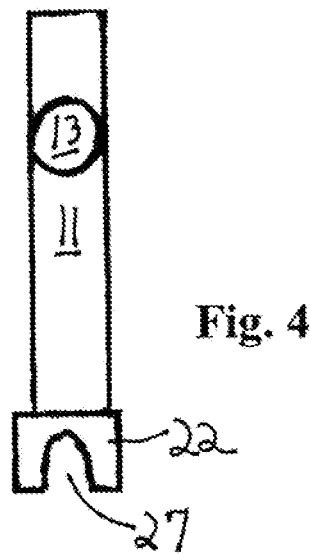
FIG. 4 shows a detailed top view of the trailer hitch insert, illustrating the concave opening and the female end of the trailer hitch insert.
Figure 5:
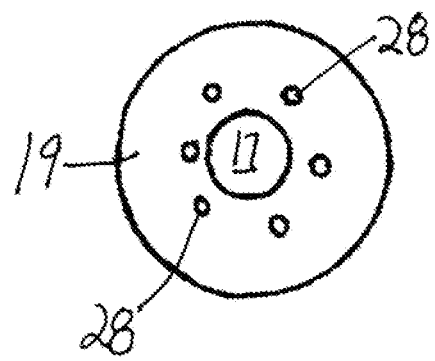
FIG. 5 shows a top view of the locking wheel plate having one or more holes.
Figure 6:
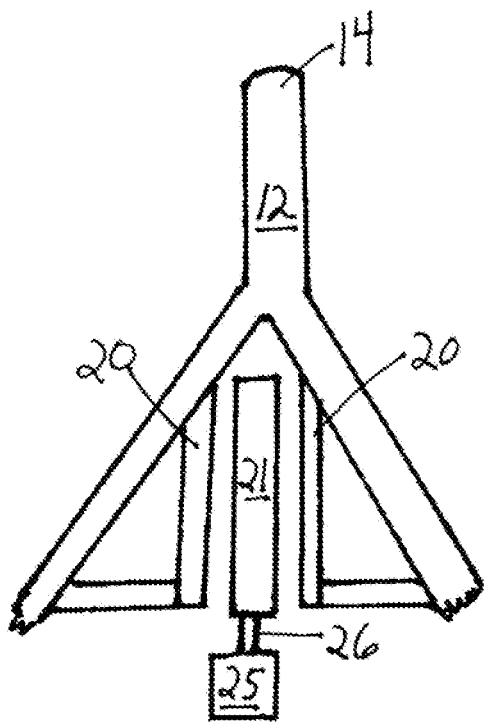
FIG. 6 shows a top view of the trailer tongue, the locking slide plate housing, and the locking slide plate.
Figure 7:
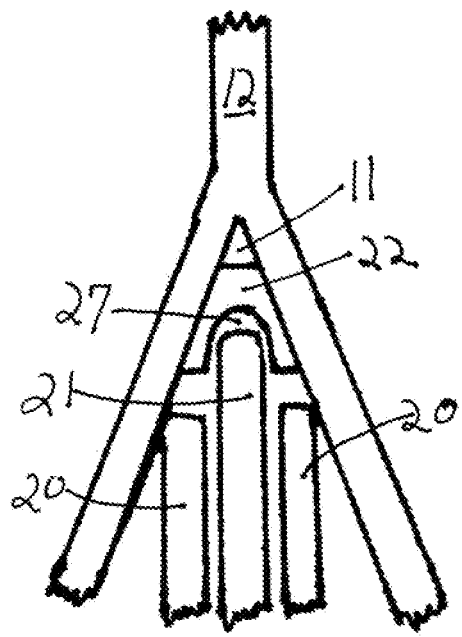
FIG. 7 shows a more detailed, enlarged top view of the trailer tongue in position over the trailer hitch insert.

FIG. 4 shows a detailed top view of trailer hitch insert 11, illustrating the concave opening 27 and the female end 22 of trailer hitch insert 11. FIG. 5 shows a top view of locking wheel plate 19 having one or more holes 28. FIG. 6 shows a top view of the trailer tongue 12, locking slide plate housing 20, and the locking slide plate 21. In this configuration locking slide plate 21 is shown withdrawn into the housing 20 by means of the spring in solenoid 25 when solenoid 25 is unenergized. Pin 26 of solenoid 25 is fixed to locking slide plate 21. In this mode the tow vehicle and trailer 10 are ready for forward motion. FIG. 7 shows a more detailed, enlarged top view of trailer tongue 12 in position over trailer hitch insert 11. Locking slide plate 21 is shown extending out of locking plate housing 20 and into concave opening 27 of the female end 22 of trailer hitch insert 11. This configuration is for backing up the trailer 10.

Figure 8A:
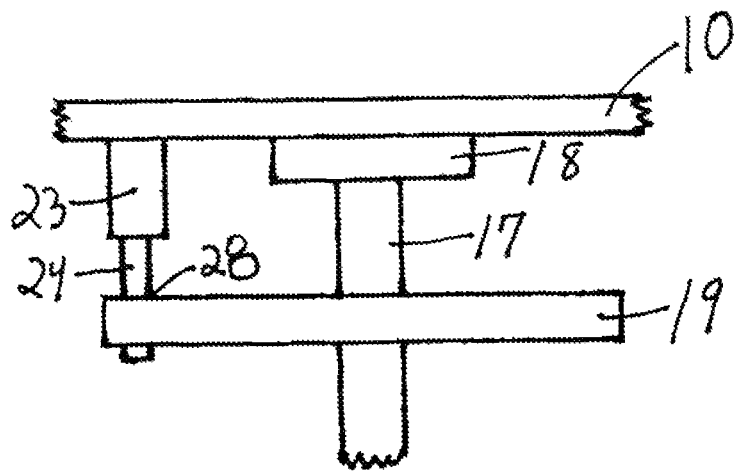
FIGS. 8a and 8b show detailed side view illustrations of the components of the anti-jackknife system in configuration for forward motion.
Figure 8B:
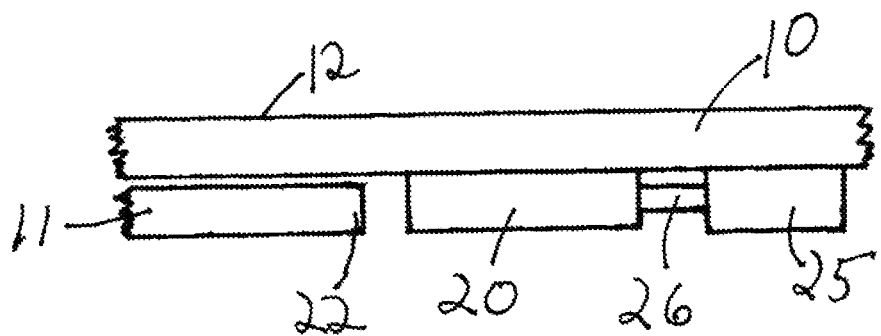

FIGS. 8a and 8b show detailed side view illustrations of the components of the present invention in configuration for forward motion. The tow vehicle is not shifted into reverse and the solenoids 23 and 25 are unenergized. Locking pins 24 of solenoids 23 are inserted into locking wheel plates 19 by means of springs in solenoids 23 so that the vertical supports 17 and caster type wheels 15 cannot rotate about a vertical axis. Locking slide plate 21 is withdrawn into housing 20 by means of a spring in solenoid 25 and the trailer tongue 12 can pivot freely on trailer hitch insert 11.

Figure 9A:
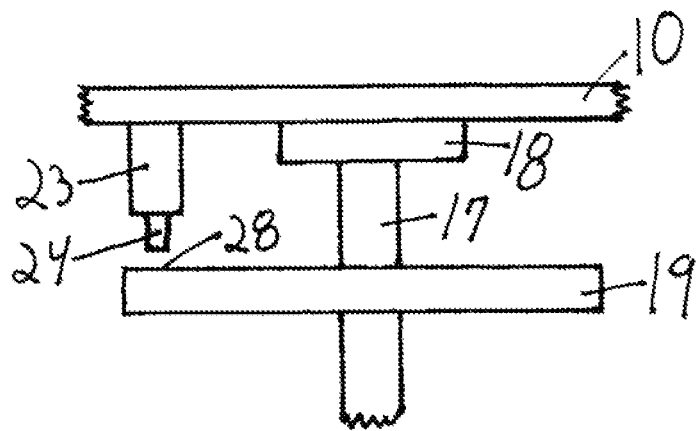
FIGS. 9a and 9b show detailed side view illustrations of the components of the anti-jackknife system in configuration for backing up the trailer.
Figure 9B:
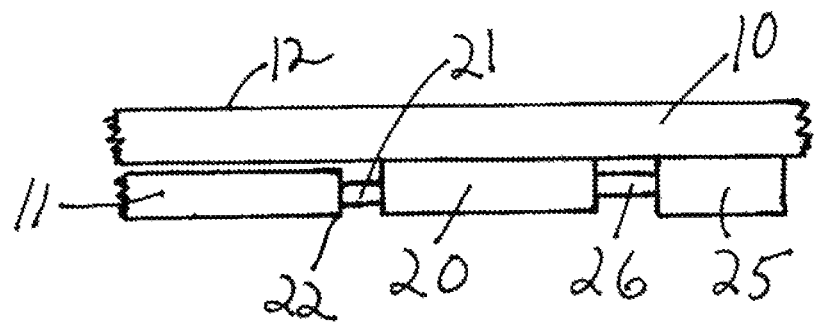

FIGS. 9a and 9b show detailed side view illustrations of the components of the present invention in configuration for backing up the trailer 10. The tow vehicle is shifted into reverse and the solenoids are energized. Pins 24 of solenoids 23 are withdrawn from locking wheel plates 19 by action of the solenoids 23 so that the vertical supports 17 and caster type wheels 15 can rotate freely about a vertical axis. Locking slide plate 21 is extended out of housing 20 and into the female end 22 of trailer hitch insert 11 by action of the solenoid 25. Trailer tongue 12 is, thus, fixed into alignment with trailer hitch insert 11 and cannot pivot freely on trailer hitch insert 11.

In operation, the tow vehicle pulls the trailer 10 forward to align the locking slide plate 21 with the female end 22 of the trailer hitch insert 11. The tow vehicle is then shifted into reverse gear. Slide plate locking mechanism 25 is thus automatically energized and will, thus, push the locking slide plate 21 into the concave opening 27 of the female end 22 of trailer hitch insert 11. Wheel locking mechanisms 23 are also automatically energized and will withdraw locking pins 24 from locking wheel plates 19. The driver can then back up the tow vehicle and trailer 10 will remain in alignment with the tow vehicle and track the tow vehicle. The trailer 10 will not be able to jackknife when the tow vehicle turns right or left during backing up. The caster type wheels 15 will rotate or swivel to accommodate the turning of the tow vehicle. When the driver is ready to move forward, the tow vehicle is taken out of reverse gear and placed into drive gear, thereby automatically unenergizing the slide plate locking mechanism 25 and the wheel locking mechanisms 23. The locking slide plate 21 is withdrawn from the female end 22 of the trailer hitch insert 11 by means of a spring as solenoid 25 is unenergized. Locking pin 24 is pushed towards locking wheel plate 19 by means of a spring as solenoid 23 is unenergized. As the driver pulls the tow vehicle forward, the pins 24 will automatically enter the holes 28 in the locking wheel plates 19 as the caster type wheels 15 swivel in response to the forward motion of the trailer 10. The holes 28 correspond to the alignment of the caster type wheels 15 with the longitudinal axis of trailer 10. This will lock the caster type wheels 15 in alignment with the longitudinal axis of trailer 10. Only one hole 28 is required in each of the locking wheel plates 19, but a plurality of holes may be used as desired.

The foregoing description has been limited to specific embodiments of this invention. It will be apparent, however, that variations and modifications may be made, by those skilled in the art, to the disclosed embodiments of the invention, with the attainment of some or all of its advantages and without departing from the spirit and scope of the present invention. For example, the spring in the slide plate locking solenoid can be constructed to attach to the slide plate and to pull the slide plate out of the hitch insert by methods well known in the art. The spring in the wheel locking solenoid can be constructed to attach to the locking pin and to push the locking pin into the hole in the locking wheel plate by methods well known in the art. The various components of the anti jackknifing system can be made of various metals or plastics or a combination thereof. The locking mechanisms can be mounted in any suitable position, angle, and location on the trailer. The locking mechanisms can be energized and controlled by electric means, hydraulic means, pneumatic means, or by screw type means. The female end of trailer hitch insert can have guide elements (not shown) to facilitate guiding the locking slide plate into a concave opening. The locking mechanisms can be energized by any other suitable means in addition to connecting them to the reverse lights electrical system.

It will be understood that various changes in the details, materials, and arrangements of the parts which have been described and illustrated above in order to explain the nature of this invention may be made by those skilled in the art without departing from the principle and scope of the invention as recited in the following claims.

The invention claimed is:

1. An anti-jackknife system for a trailer, comprising:
   a) a trailer hitch insert attachable to a tow vehicle, and a tongue on a front end of the trailer, wherein said tongue has a locking slide plate and wherein said tongue is reversibly and rotatably attached to said trailer hitch insert;
   b) rotatable caster wheels attached to an opposite rear end of the trailer, said caster wheels having a locking wheel plate attached thereto;
   c) a slide plate locking mechanism attached to said tongue, wherein said slide plate locking mechanism inserts said locking slide plate into said trailer hitch insert when said slide plate locking mechanism is energized, and wherein said slide plate locking mechanism withdraws said locking slide plate from said trailer hitch insert when said slide plate locking mechanism is not energized; and
   d) wheel locking mechanisms attached to the trailer, each of said wheel locking mechanisms having a locking pin which is inserted into a hole in said locking wheel plate when said wheel locking mechanism is not energized, and is removed from said hole in said locking wheel plate when said wheel locking mechanism is energized; wherein said tongue does not rotate on said trailer hitch insert only when said slide plate locking mechanism is energized, and said caster wheels are rotatable about a vertical axis only when said wheel locking mechanisms are energized; and wherein said slide plate locking mechanism is a solenoid having a connecting pin fixed to said locking slide plate to insert said locking slide plate into said trailer hitch insert when said solenoid is energized to prevent said tongue from rotating on said trailer hitch insert, and to withdraw said locking slide plate from said trailer hitch insert by means of a spring in said solenoid when said solenoid is not energized to allow said tongue to rotate on said trailer hitch insert.

2. The anti-jackknife system of claim 1 wherein said wheel locking mechanism is a second solenoid having said locking pin which is withdrawn from said hole in said locking wheel plate when said second solenoid is energized to allow said caster wheel to rotate about the vertical axis, and which is inserted into said hole in said locking wheel plate by means of a spring in said second solenoid when said second solenoid is not energized, thereby preventing said castor wheel from rotating about said vertical axis.

3. The anti jackknife system of claim 2 wherein when said locking pin is inserted into said hole in said locking wheel plat, said caster wheel will turn only in a direction parallel to a longitudinal center line of the trailer and to a line of direction of travel.

4. The anti jackknife system of claim 3 wherein when said locking pin is withdrawn from said hole in said locking wheel plate, said caster wheels will turn in a direction corresponding to front wheels of the tow vehicle.

5. The anti-jackknife system of claim 4 wherein said slide plate locking mechanism and said wheel locking mechanisms are energized simultaneously by placing said tow vehicle in reverse.

6. The anti jackknife system of claim 1 wherein said locking slide plate reversibly aligns said tongue with said trailer hitch insert when said locking slide plate is inserted into said trailer hitch insert, so that the trailer will stay in linear alignment with the tow vehicle when the trailer is backed up by the tow vehicle, and jackknifing is thereby prevented during the backing up of the trailer.

7. An anti jackknife system for a trailer, comprising:
   a) a trailer hitch insert for a tow vehicle and a tongue on a front end of the trailer, wherein said tongue has a locking slide plate;
   b) rotatable caster wheels attached to an opposite rear end of the trailer, said caster wheels having a locking wheel plate attached thereto;
   c) a slide plate locking mechanism which inserts said locking slide plate into said trailer hitch insert when said slide plate locking mechanism is energized; and
   d) wheel locking mechanisms each having a locking pin which is removed from a hole in said locking wheel plate when said wheel locking mechanism is energized; wherein said tongue does not rotate on said trailer hitch insert only when said slide plate locking mechanism is energized, and said caster wheels are rotatable about a vertical axis only when said wheel locking mechanisms are energized; wherein jackknifing of the trailer is prevented during backing up of the trailer by a tow vehicle when said slide plate locking mechanism and said wheel locking mechanisms are energized simultaneously; and wherein said slide plate locking mechanism and said wheel locking mechanisms are energized simultaneously by placing said tow vehicle in reverse.

* * * * *